Jan. 20, 1931.  R. S. TAYLOR  1,789,346
REFRIGERATION
Filed Jan. 30, 1929   2 Sheets-Sheet 1

INVENTOR
Robert Seth Taylor
BY
his ATTORNEY

Jan. 20, 1931.  R. S. TAYLOR  1,789,346
REFRIGERATION
Filed Jan. 30, 1929  2 Sheets-Sheet 2

INVENTOR
Robert Seth Taylor
BY
Wm T Hedlund
his ATTORNEY

Patented Jan. 20, 1931

1,789,346

UNITED STATES PATENT OFFICE

ROBERT SETH TAYLOR, OF NEW YORK, N. Y., ASSIGNOR TO ELECTROLUX SERVEL CORPORATION, OF NEW YORK, N. Y., A CORPORATION OF DELAWARE

REFRIGERATION

Application filed January 30, 1929. Serial No. 336,118.

My invention relates to refrigerating systems of the absorption type and particularly to refrigerating systems of the multiple absorption cycle type.

In previously proposed systems using two absorbers, one absorber being used to replace a condenser, only one absorption liquid has been used. This absorption liquid is usually water. In order to maintain a balance of amount of absorption liquid in the different cycles it has been necessary to provide what might be termed draining conduits. These systems have become complicated to a considerable extent.

I propose to overcome the difficulties incident to maintaining a proper relation of fluids in the cycle by utilizing a plurality of absorption liquids, with a different absorption liquid for each cycle. This provides a simpler apparatus. By using absorption liquids immiscible in each other, that is not absorbable in each other, I am able to simplify the separation by utilizing flotation.

The object of the invention is to provide an absorption system of low operating pressure with stability of cycle operation and without complicated conduit connections.

Figure 1:
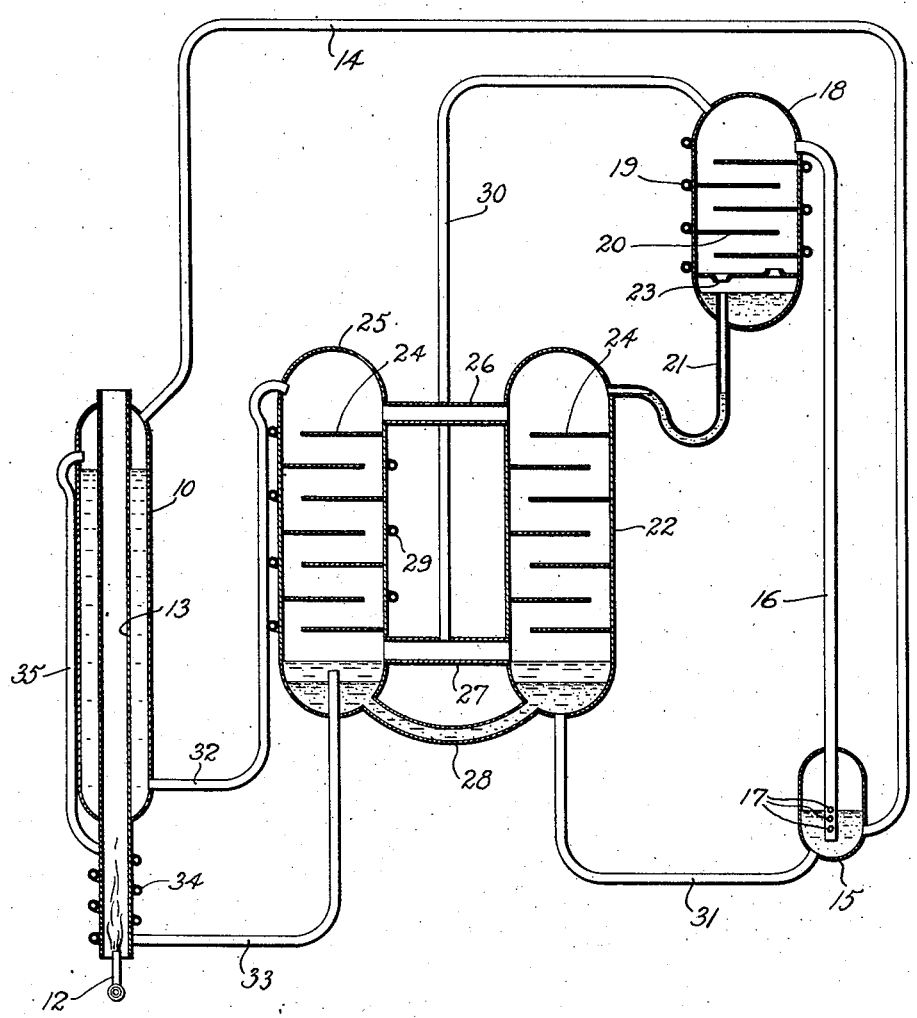
Figure 2:
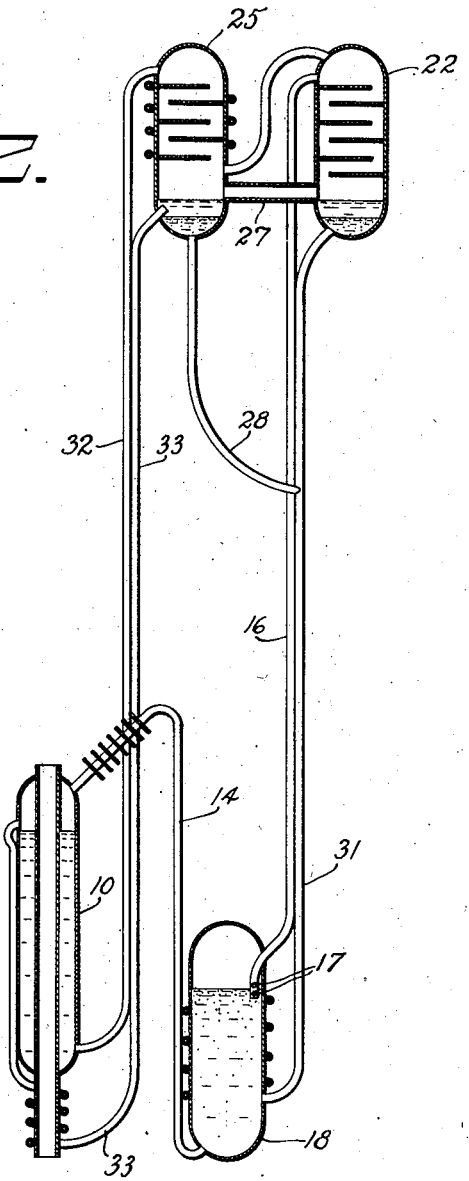

The nature of the invention will be made apparent by the following description taken in connection with the accompanying drawings on which:

Fig. 1 shows more or less diagrammatically one system for carrying out the invention employing four different fluids; and Fig. 2 shows a modified system for carrying out the invention employing three different fluids.

Referring more particularly to Fig. 1, reference character 10 designates a generator containing a solution of a refrigerant in a first absorption liquid. While various refrigerants and various absorption liquids may be used, I prefer methylamine as a refrigerant and water as the absorption liquid. The generator is heated by any suitable means, such as a gas burner 12 projecting into a flue 13 running through the generator. The upper part of the generator is connected by means of a conduit 14 with a chamber 15 which contains a second absorption liquid. While various absorption liquids can be used, I prefer, for use with methylamine and water, trichloroethane, otherwise known as monochlorochloride, having the formula $CH_2Cl.CH_2Cl_2$. This substance has a specific gravity of about 1.46 and is immiscible with water. Extending upwardly from chamber 15 is a riser pipe 16. Riser pipe 16 extends downwardly in chamber 15 and preferably has one or more apertures 17 in the side thereof. Chamber 15 and riser pipe 16 constitute a gas lift.

The methylamine vapor entering chamber 15 causes a gas lift or percolator or thermosiphon action lifting liquid through riser pipe 16 and into an absorber 18. The methylamine is partly dissolved in chamber 15 and in riser pipe 16. In absorber 18 there is further dissolving of methylamine in the trichloroethane, the absorber being cooled by running water in coil 19. Absorber 18 contains a series of disks or plates 20 over which the absorption liquid cascades downwardly. From the absorber the solution of the refrigerant in the absorption liquid, that is the methylamine in the trichloroethane, passes through conduit 21 and into evaporator 22. The lowermost disk within absorber 18 is formed with a drip opening 23 above conduit 21 in order to induce liquid from the bottom of the absorber into conduit 21.

Evaporator 22, the member of the system in heat exchange relation with the objective of refrigeration, contains an inert gas such as hydrogen into which the methylamine diffuses, evaporating from solution. The evaporator contains a series of disks 24 over which the solution flows downwardly.

Arranged at the same level as the evaporator and connected thereto is an absorber 25. Absorber 25 likewise contains disks 24. The upper part of absorber 25 is connected with the upper part of the evaporator by means of conduit 26. At a lower part of each of these vessels is another cross connection 27. At a still lower level is a cross connection 28. Absorber 25 is cooled by running water in coil 29.

A vent pipe 30 connects absorber 18 with conduit 27. A conduit 31 connects a low point of evaporator 22 with chamber 15.

A conduit 32 connects the lower part of generator 10 with the upper part of absorber 25. This conduit is arranged to be cooled by coil 29. A conduit 33 connects a lower part of absorber 25 with a thermo-siphon coil or gas lift 34 arranged to receive heat from gas burner 12. A riser pipe 35 extends upwardly from coil 34 into the upper part of the generator. Coil 34 and riser pipe 35 may be considered as together forming a gas lift.

The above described system has one major cycle for the flow of the refrigerant, methylamine, and three local cycles. One local cycle is formed by the generator 10, absorber 25, coil 34 and conduits 32, 33 and 35. This I will designate the first absorption liquid cycle. The absorption liquid in this cycle is water which flows from the generator through conduit 32 and into the absorber, down through the absorber picking up methylamine and forming a strong liquor, thence through conduit 33 and upwardly through coil 34 and riser pipe 35 into the upper part of the generator. A circulation is produced by the formation of vapor in coil 34. Inasmuch as I designate this as the first cycle, I consider absorber 25 a first absorber and parts 34 and 35 a first gas lift.

A second local cycle is formed by absorber 18, evaporator 22 and chamber 15. This I designate a second absorber liquid cycle. I designate absorber 18 as a second absorber and chamber 15 and riser pipe 16 as a second gas lift. In this second absorption liquid cycle the absorption liquid is trichloroethane which dissolves methylamine in chamber 15, is lifted through riser pipe 16 due to the introduction of methylamine vapor into chamber 15, which flows down through the second absorber 18, dissolving more methylamine and which flows into the evaporator through conduit 21. This absorption liquid flows down through the evaporator and back through conduit 31 into chamber 15.

A third local cycle is formed by the evaporator and first absorber together with conduits 26, 27 and 28. In this cycle hydrogen gas flows downwardly through evaporator 22, through conduit 27 to the first absorber 25, upwardly through the first absorber and back to the evaporator through conduit 26. In evaporator 22 the hydrogen serves to draw the methylamine out of solution and a mixture of methylamine vapor and hydrogen is formed. This mixture of gas being heavier than hydrogen alone flows downwardly in the evaporator and through conduit 27 to absorber 25. In absorber 25, absorption liquid of the first cycle, water, dissolves the methylamine liberating the hydrogen. It will be seen that circulation is produced between the evaporator and absorber 25 due to difference of specific weight of the gas in the evaporator and absorber 25 respectively.

Water and trichloroethane are immiscible. The water is the lighter. Consequently the water will float on the trichloroethane in the first absorber and in the evaporator. Pools are formed in the lower part of these vessels, the lower part of each pool comprising trichloroethane and the upper part water. Conduit 33, which is designed to withdraw water from the pool in the first absorber, is connected at such a level that water is carried off, that is at a higher level than the normal level of the trichloroethane. Conduit 31, which is designed to withdraw trichloroethane from the evaporator, is connected thereto at a lower point, that is below the level of trichloroethane. Thus the fluids are separated by flotation. Cross connection 28 keeps a uniform height of pools in the first absorber and the evaporator. The absorption liquids are in the presence of each other in the lower part of the evaporator-absorber cycle and the cross connection 28 acts to combine the pools of the evaporator and the first absorber into a common pool of the absorption liquids of the two absorption liquid cycles. It will be seen that water in evaporator 22 does no harm in such an arrangement and that trichloroethane in absorber 25 does no harm in such an arrangement.

The apparatus is hermetically sealed and operates at a low pressure. The quantity of fluid can be readily determined and there is no difficulty in maintaining the proper level. Some water will be carried over into absorber 18. This water will float on the trichloroethane in absorber 18 and due to the action of drip opening 23 will be carried off into conduit 21 and into evaporator 22.

Any inert gas passing upwardly into the higher parts of the system will be carried through conduit 30 into the evaporator-absorber cycle.

The system shown in Fig. 2 differs principally from the arrangement of Fig. 1 in that the inert gas is omitted and the necessary difference of pressure between the generator and the evaporator is maintained by liquid columns in pipes 16, 31, 32 and 33. Methylamine vapor is driven off in generator 10 and passes through conduit 14 into absorber 18. The gas lift chamber 15 of Fig. 1 is combined with absorber 18 in Fig. 2. Excess pressure in the upper part of absorber 18 lifts the solution upwardly through riser pipe 16 and into evaporator 22. Water is introduced into absorber 25 from conduit 32 and dissolves the methylamine which leaves the trichloroethane in evaporator 22. The strong liquor returns from the absorber 25 through conduit 33 and into generator 10.

While I have described several forms of my invention, it will be understood that other forms are possible within the scope and spirit thereof. Furthermore, the invention is not to be limited to the arrangements shown diagrammatically on the drawings. Furthermore, the method of transferring liquids within the system may be modified while retaining the principles of the invention.

Having thus described my invention, what I claim is:

1. A refrigerating system of the multiple absorption cycle type comprising a generator and a first absorber interconnected to form a first absorption cycle for circulating a first absorption liquid and a second absorber and an evaporator interconnected to form a second absorption cycle for circulating a second absorption liquid, the first absorber and the evaporator being interconnected to form an evaporator-absorber cycle and the generator, the first absorber, the second absorber and the evaporator being interconnected to form a major refrigerant cycle, said system including means for providing a common pool of the absorption liquids of the different absorption cycles in the evaporation-absorber cycle and means for withdrawing absorption liquid from the common pool to the first and second absorption cycles at different levels.

2. A refrigerating system of the multiple absorption cycle type comprising a generator and a first absorber interconnected to form a first absorption cycle for circulating a first absorption liquid and a second absorber and an evaporator interconnected to form a second absorption cycle for circulating a second absorption liquid, the first absorber and the evaporator being interconnected to form an evaporator-absorber cycle and the generator, the first absorber, the second absorber and the evaporator being interconnected to form a major refrigerant cycle, said system including means for providing a common pool of the absorption liquids of the different absorption cycles in the evaporator-absorber cycle and means for withdrawing, from different levels in the common pool, weak liquor of the second absorption cycle and strong liquor of the first absorption cycle.

3. A refrigerating system of the multiple absorption cycle type comprising a generator and a first absorber interconnected to form a first absorption cycle and a second absorber and an evaporator interconnected to form a second absorption cycle, the first absorber and the evaporator being interconnected to form an evaporator-absorber cycle and the generator, the first absorber, the second absorber and the evaporator being interconnected to form a major refrigerant cycle, said system including a conduit directly connecting the lower part of the first absorber with the lower part of the evaporator and adapted to hold liquid and conduits connected to the lower parts of the first absorber and the evaporator respectively at different levels and forming parts of the first absorption cycle and second absorption cycle respectively.

4. Refrigerating apparatus comprising a generator, a first absorber, a second absorber, an evaporator, a first gas lift, a second gas lift, the aforesaid parts being interconnected to form a system for circulation of a refrigerant and two solvents therefor, said system including a conduit directly connecting the lower part of the first absorber with the lower part of the evaporator and adapted to hold liquid and conduits connected to the lower parts of the first absorber and evaporator respectively at different levels and connected respectively to the first and second gas lifts.

5. Refrigerating apparatus comprising a generator, a first absorber, a second absorber, an evaporator, a first gas lift, a second gas lift, the aforesaid parts being interconnected to form a system for circulation of a refrigerant and two solvents therefor, said system including a conduit connected to the first absorber at a given level and connected to the first gas lift and a conduit connected to the evaporator at a lower level and connected to the second gas lift.

6. Refrigerating apparatus comprising a generator, a first absorber, a second absorber, an evaporator, a first gas lift, a second gas lift, the aforesaid parts being interconnected to form a system for circulation of a refrigerant, two solvents therefor and an inert gas, said system including a plurality of conduits for circulating the inert gas between the evaporator and first absorber, a conduit directly connecting the lower part of the first absorber with the lower part of the evaporator and adapted to hold liquid and conduits connected to the lower parts of first absorber and evaporator respectively at different levels and connected respectively to the first and second gas lifts.

7. That improvement in the art of refrigerating by the aid of a multiple absorption cycle system including a first cycle comprising a generator and a first absorber and a second cycle comprising a second absorber and an evaporator which consists in conveying different absorption liquids of different specific gravities in the first and second cycles and maintaining a separation of the different absorption liquids by flotation.

8. Refrigerating apparatus comprising an evaporator and an absorber arranged at substantially the same level and interconnected to form equalized pools of liquid in the lower parts thereof, means to supply a solution to the evaporator, means to supply absorption liquid to the absorber and means to withdraw solutions from both the evaporator and the absorber.

9. Refrigerating apparatus comprising an evaporator and an absorber arranged at substantially the same level and interconnected to form equalized pools of liquid in the lower parts thereof, means to supply a solution to the evaporator, means to supply absorption liquid to the absorber and means to withdraw solutions from both the evaporator and the absorber at different levels respectively.

10. Refrigerating apparatus comprising an evaporator and an absorber arranged at substantially the same level and interconnected to form equalized pools of liquid in the lower parts thereof, means to circulate gas between and through the evaporator and absorber, means to supply an obsorption liquid to the absorber, means to supply a solution of a refrigerant in a second absorption liquid to the evaporator, means to withdraw absorption liquid from the evaporator at one level and means to withdraw solution from the absorber at a different level.

11. Refrigerating apparatus comprising an evaporator and an absorber arranged at substantially the same level and interconnected to form equalized pools of liquid in the lower parts thereof, means to circulate gas between and through the evaporator and absorber, means to supply an absorption liquid to the absorber, means to supply a solution of a refrigerant in a second absorption liquid to the evaporator, means to withdraw absorption liquid from the evaporator at a lower level and means to withdraw solution from the absorber at a higher level.

12. Refrigerating apparatus comprising an evaporator and an absorber arranged at substantially the same level and interconnected to form equalized pools of liquid in the lower parts thereof, means to circulate gas between and through the evaporator and absorber, means to supply an absorption liquid to the absorber, means to supply a solution of a refrigerant in a second absorption liquid to the evaporator, the second absorption liquid being immiscible with and of different specific gravity than the first absorption liquid, means to withdraw absorption liquid from the evaporator at one level and means to withdraw solution from the absorber at a different level.

13. Refrigerating apparatus comprising an evaporator and an absorber arranged at substantially the same level and interconnected to form equalized pools of liquid in the lower parts thereof, means to circulate gas between and through the evaporator and absorber, means to supply an absorption liquid to the absorber, means to supply a solution of a refrigerant in a second absorption liquid to the evaporator, the second absorption liquid being immiscible with and heavier than the first absorption liquid, means to withdraw absorption liquid from the evaporator at a lower level and means to withdraw solution from the absorber at a higher level.

14. That improvement in the art of refrigeration which comprises absorbing a refrigerant in a first absorption liquid, expelling the refrigerant from said first absorption liquid, absorbing the refrigerant in a second absorption liquid having a different chemical composition than the first absorption liquid, releasing the refrigerant from said second absorption liquid into an inert gas to produce refrigeration and again absorbing the refrigerant in said first absorption liquid.

15. That improvement in the art of refrigeration which comprises absorbing a refrigerant in a first absorption liquid, expelling the refrigerant from said first absorption liquid, absorbing the refrigerant in a second absorption liquid having a different chemical composition than the first absorption liquid, releasing the refrigerant from said second absorption liquid into an inert gas to produce refrigeration, bringing said refrigerant and said second absorption liquid into the presence of said first absorption liquid, again absorbing the refrigerant in said first absorption liquid and separating said first absorption liquid from said second absorption liquid by flotation.

16. That improvement in the art of refrigeration which comprises absorbing a refrigerant in a first absorption liquid, expelling the refrigerant from said first absorption liquid, absorbing the refrigerant in a second absorption liquid having a different chemical composition than said first absorption liquid, releasing the refrigerant from said second absorption liquid to produce refrigeration and again absorbing the refrigerant in said first absorption liquid.

17. That improvement in the art of refrigeration which comprises absorbing a refrigerant in a first absorption liquid, expelling the refrigerant from said first absorption liquid, absorbing the refrigerant in a second absorption liquid having a different chemical composition than said first absorption liquid, releasing the refrigerant from said second absorption liquid to produce refrigeration, bringing said refrigerant and said second absorption liquid into the presence of said first absorption liquid, again absorbing the refrigerant in said first absorption liquid and separating said first absorption liquid from said second absorption liquid by flotation.

18. That improvement in the art of refrigeration which comprises absorbing a refrigerant in a first absorption liquid having a given specific gravity, expelling the refrigerant from said first absorption liquid, absorbing the refrigerant in a second absorption liquid having a greater specific gravity than said first absorption liquid, releasing the refrigerant from said second absorption liquid into an inert gas to produce refrigeration, bringing said refrigerant and said second absorption liquid into the presence of said first absorption liquid, again absorbing the refrigerant in said first absorption liquid, withdrawing said second absorption liquid at a low level and withdrawing said first absorption liquid at a higher level.

19. That improvement in the art of refrigeration which comprises absorbing a refrigerant in a first absorption liquid having a given specific gravity, expelling the refrigerant from said first absorption liquid, absorbing the refrigerant in a second absorption liquid having a greater specific gravity than said first absorption liquid, releasing the refrigerant from said second absorption liquid to produce refrigeration, bringing said refrigerant and said second absorption liquid into the presence of said first absorption liquid, again absorbing the refrigerant in said first absorption liquid, withdrawing said second absorption liquid at a low level and withdrawing said first absorption liquid at a higher level.

20. Refrigerating apparatus comprising a generator for expelling vapor from solution, a first absorber, a second absorber, an evaporator, said second absorber being situated above said evaporator, conduits connecting said generator with said first absorber forming a cycle for circulation of absorption liquid, a gas lift, conduits connecting said second absorber, said evaporator and said gas lift to form a second absorption liquid cycle, means for flow of gaseous fluid between said evaporator and said first absorber and a conduit for conducting substantially all the vapor expelled in the generator to said gas lift.

In testimony whereof I have affixed my signature.

ROBERT SETH TAYLOR.